Feb. 23, 1926. 1,574,143
C. WHITE
CONVEYER SYSTEM
Filed April 1, 1925  4 Sheets-Sheet 1

Feb. 23, 1926.  
C. WHITE  
CONVEYER SYSTEM  
Filed April 1, 1925  
1,574,143  
4 Sheets-Sheet 4

INVENTOR  
CLARENCE WHITE  
BY White Prost Evans  
his ATTORNEYS

Patented Feb. 23, 1926.

1,574,143

UNITED STATES PATENT OFFICE.

CLARENCE WHITE, OF SAN FRANCISCO, CALIFORNIA.

CONVEYER SYSTEM.

Application filed April 1, 1925. Serial No. 19,981.

*To all whom it may concern:*

Be it known that I, CLARENCE WHITE, a citizen of the United States, and a resident of the city and county of San Francisco, State of California, have invented a certain new and useful Conveyer System, of which the following is a specification.

The invention relates to a conveyer system, particularly adapted for use in the piling or storing and reclaiming materials or articles such as sacked sugar, sugar beets, etc., in warehouses or open piles.

An object of the invention is to provide a conveyer system which will convey the articles to be piled or stacked to any point within the volumetric dimensions of a warehouse, and which also may be used for unstacking or unpiling the articles, taking them from any point in the volumetric dimensions of the warehouse to a destination.

Another object of the invention is to provide a conveyer system, the operation of which may be reversed, so that articles may be stacked or reclaimed.

A further object of the invention is to provide a conveyer system including a main conveyer having a fixed path of travel in combination with a distributing or reclaiming conveyer which is mounted for both vertical and horizontal adjustment, so that it may be positioned in any desired location within the building.

A further object of the invention is to provide means for transporting articles from the main conveyer to the distributing conveyer, and vice versa, regardless of the horizontal and vertical displacement of the distributing conveyer.

A further object of the invention is to provide a conveyer system comprising two superposed main conveyers, traveling in opposite directions, in combination with auxiliary conveying means which is adjustable to cooperative relation with either of the main conveyers.

A further object of the conveyer is to provide a distributing or reclaiming conveyer system which is movable as a whole, so that the distributing or reclaiming station of the system may be moved to any desirable vertical or horizontal position.

The invention possesses other advantageous features, some of which with the foregoing, will be set forth at length in the following description where I shall outline in full that form of the invention which I have selected for illustration in the drawings accompanying and forming part of the present specification. In said drawings I have shown one form of conveyer system embodying my invention, but it is to be understood that I do not limit myself to such form, since the invention, as set forth in the claims, may be embodied in a plurality of forms.

Referring to said drawings.

Figure 1:
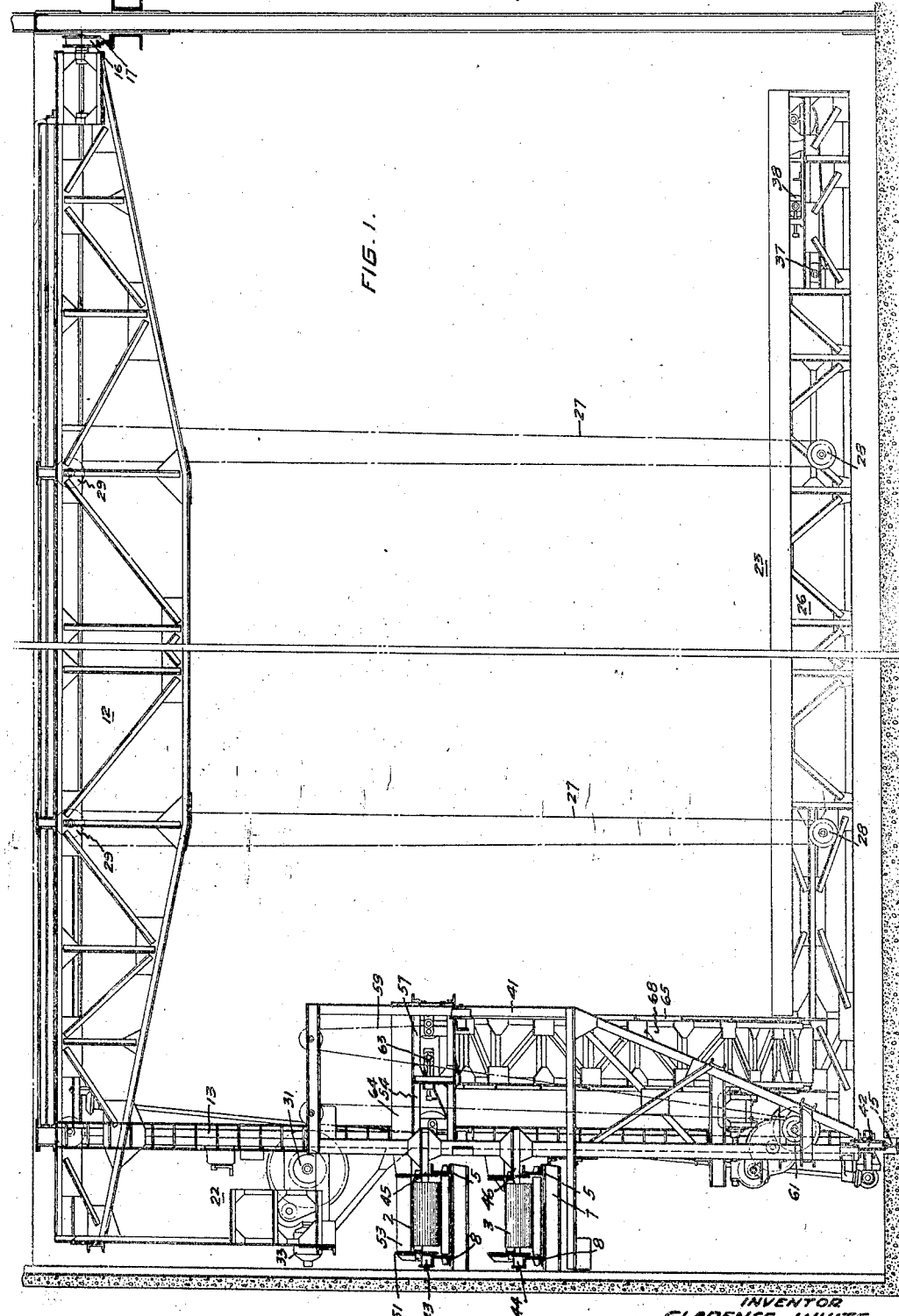
Figure 1 is a transverse section through an aisle in a warehouse building, showing the conveyer system of my invention in side elevation, the suspended conveyer being in its lowermost position.
Figure 2:
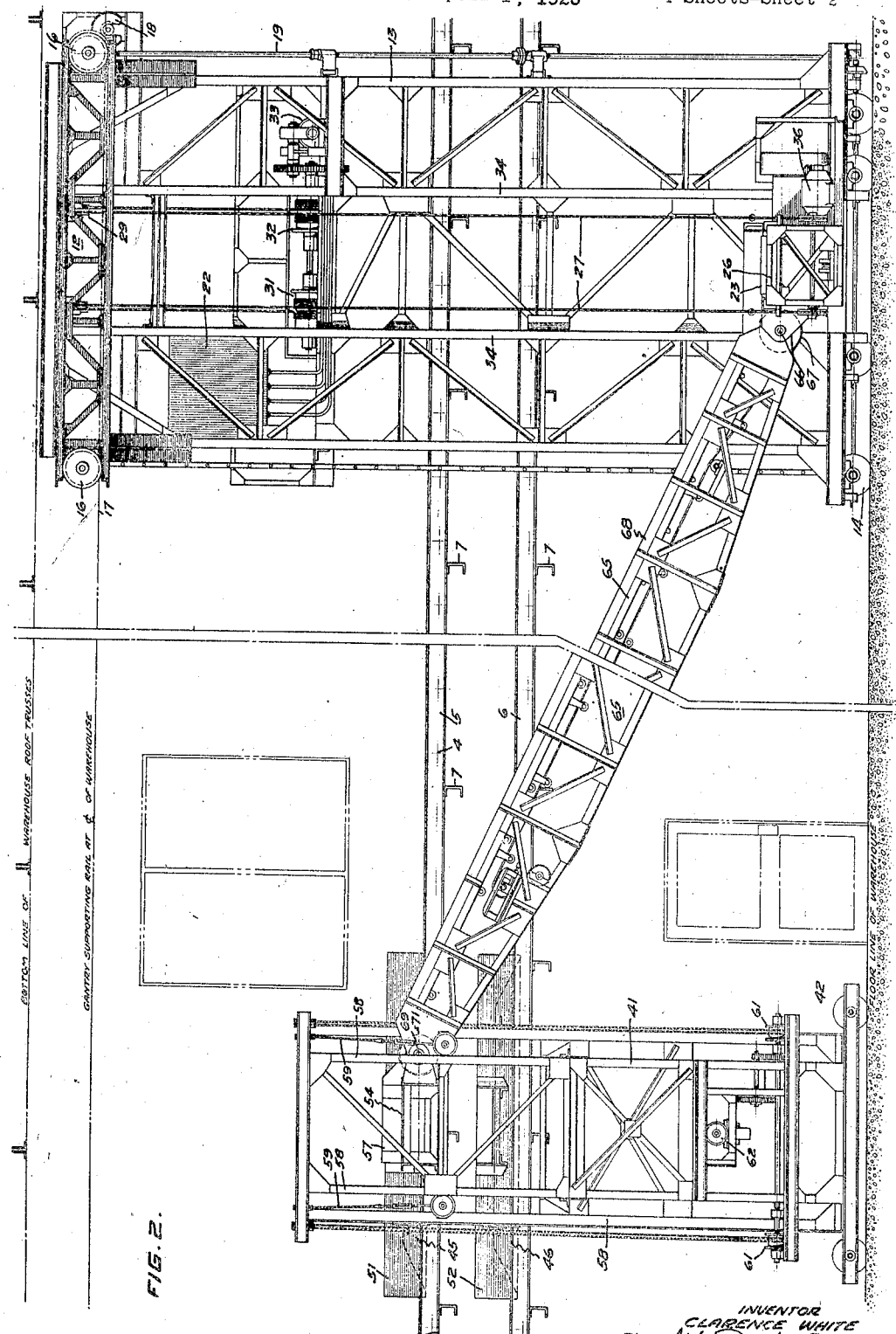
Figure 2 is a longitudinal section through a warehouse building, showing the conveyer system of my invention in elevation, the suspended conveyer being in its lowermost position, part of the structure being broken away to reduce the size of the figure.
Figure 3:
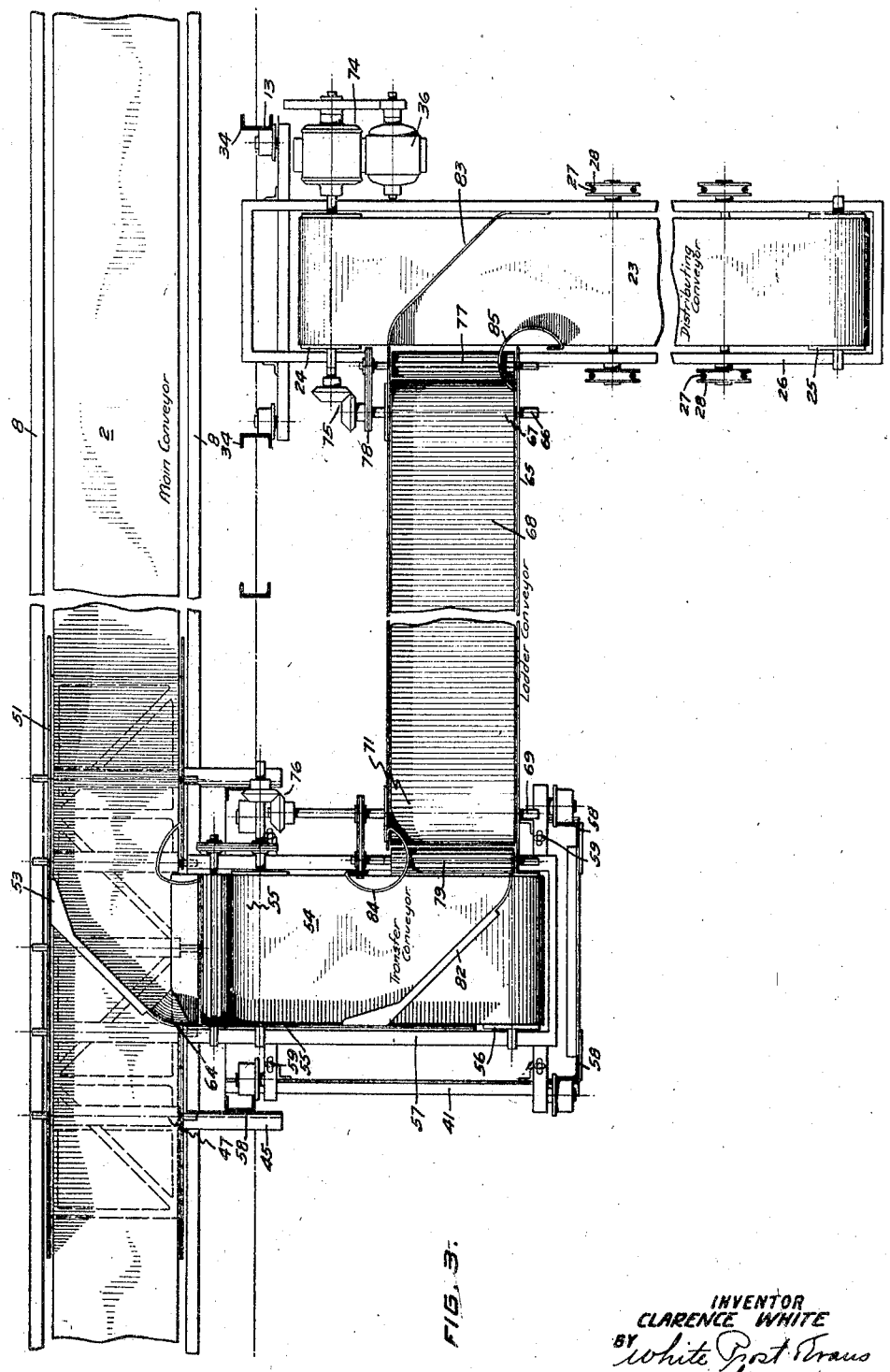
Figure 3 is a plan or top view of the conveyer system of my invention, parts thereof being broken away to reduce the size of the figure.
Figure 4:
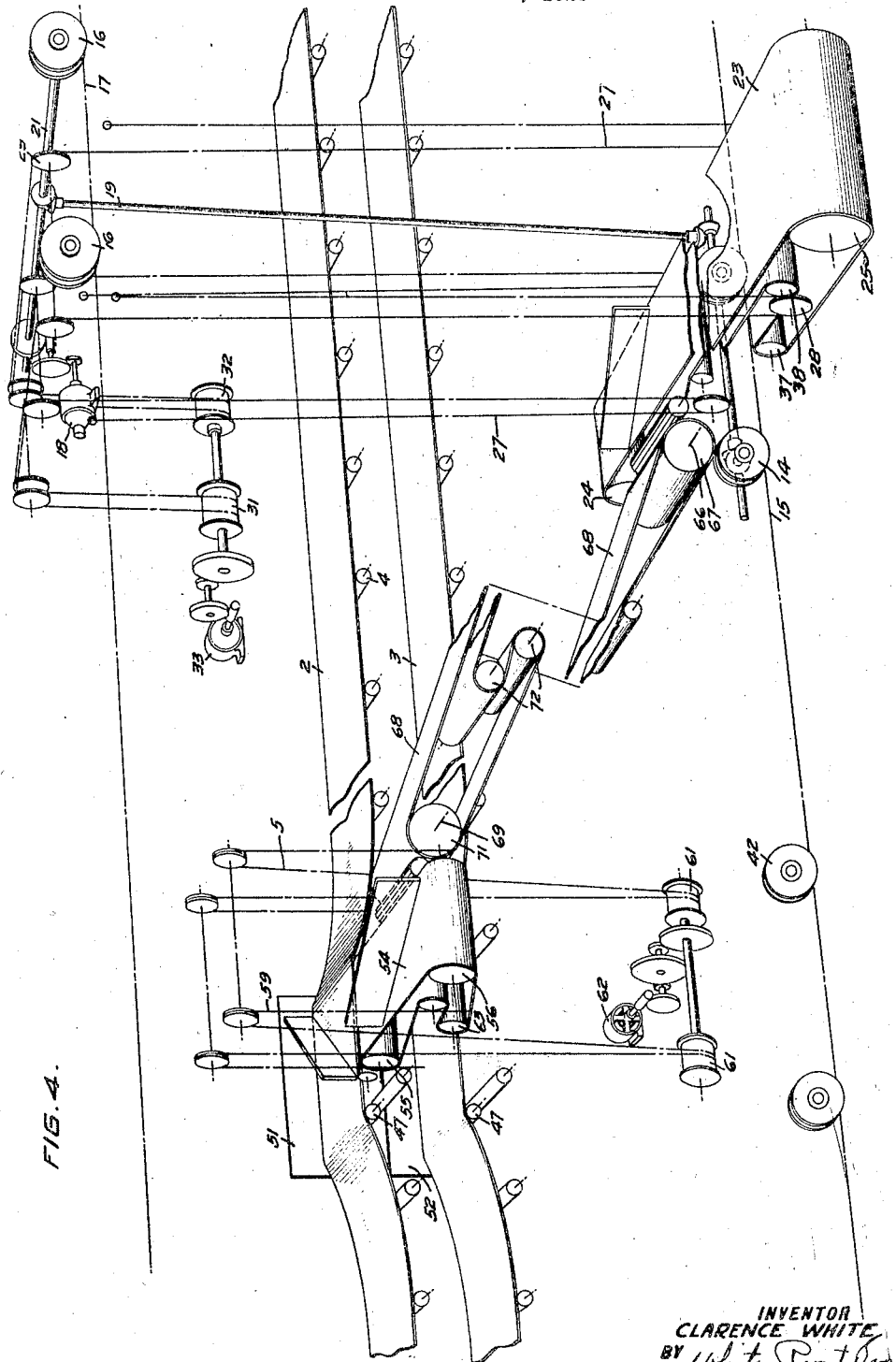
Figure 4 is a perspective diagrammatic view of the conveyer system of my invention, parts thereof being broken away to reduce the size of the figure.

The conveyer system of my invention may be installed in a warehouse for the purpose of stacking or unstacking articles therein or may be arranged in the open for the purpose of adding or removing articles to a pile. The system is particularly advantageous in the stacking and reclaiming of packages such as boxes, filled sacks and other articles, but may be used with equal advantage on all articles which may be accumulated in high stacks or piles. In the drawings I have shown the conveyer system installed in an aisle in a warehouse building and in the following specification, the system will be described in such environment.

In the construction shown in the accompanying drawings, the system comprises a main conveyer and an auxiliary conveying system for conveying articles from the main conveyer to a selected point within the volumetric dimensions of the warehouse or for conveying the articles from such selected point to the main conveyer system. In the present instance, the main conveyer comprises two superposed conveyer belts 2—3 extending longitudinally through the warehouse and arranged adjacent one of the side walls thereof. These conveyer belts 2 and 3 usually comprise the upper and lower runs of an endless belt conveyer, so that the two conveyer belts 2 and 3 travel in opposite directions. These belts serve to convey the articles into and out of the warehouse and to and from the distributing conveyer system. The belts 2 and 3 are supported on rollers 4 journaled in frames or runways 5 and 6 suitably supported on structural elements 7 extending from the side wall of the building and arranged adjacent said side wall. The skirtboards 8 of the runways are preferably formed of channel iron and the conveyers are positioned below the upper edges of the skirtboards, so that the articles on the conveyers are held in place thereon by the skirtboards. Either of the conveyers 5 and 6 may be employed for carrying articles into or out of the warehouse, receiving articles from different ends of the warehouse and discharging them at different ends of the warehouse, due to the fact that the two conveyers 2 and 3 travel in opposite directions. Means are provided for removing the articles from the main conveyers and distributing them throughout the warehouse, or vice versa, for receiving the articles at distributed points throughout the warehouse and discharging them on to the conveyers. The distributing or reclaiming conveyer system comprises a traveling crane 12 preferably of the gantry type, the leg 13 of the gantry being provided on its lower end with wheels 14 which engage the rail 15 extending longitudinally of the warehouse. The other end of the crane is provided with wheels 16 which engage a rail 17 extending longitudinally of the warehouse and supported on the structural elements thereof adjacent the roof of the warehouse. Means are provided for driving the crane, so that it may travel for the length of the warehouse and such means in the present instance, comprises an electric motor 18 mounted on the crane and suitably connected by a drive shaft 19 with the wheels 14 and by the drive shaft 21 with the wheels 16. The motor 18 is of the reversible type, so that the crane may be caused to travel in either direction. The control switches of the motor 18 are arranged in the pulpit 22 mounted on the crane and from this pulpit the operator controls the operation of the conveyer system.

Associated with the crane 12 is a distributing conveyer 23, preferably disposed to travel in a path at right angles to the path of travel of the main conveyers 2 and 3, and the position of the distributing conveyer 23 is adjustable vertically, so that, due to the longitudinal adjustment of the crane and the vertical adjustment of the conveyer 23, the conveyer 23 may be positioned at any point within the volumetric dimensions of the warehouse. The distributing conveyer 23 is preferably a belt conveyer and is mounted on rollers 24—25 journaled in the frame 26. In the present instance, the frame 26 is suspended from the crane 12 by the cables 27 which are anchored at one end on the crane 12 and which pass under sheaves 28 on the frame 26 and over sheaves 29 on the crane 12 to winding drums 31—32 mounted in the leg of the crane. The winding drums 31 and 32 are driven through suitable reduction gearing by the electric motor 33 which is also mounted in the leg of the crane. This motor 33 is reversible to raise and lower the frame 26 and the controls thereof are arranged in the pulpit 22. The frame 26 is guided in its vertical movement by the guide rails 34, secured to or forming part of the crane leg 13. One end of the frame structure 26 is in engagement with the vertical guide rails and, in the present construction, the other end of the frame 26 is unguided.

The conveyer belt 23 is driven by the reversible electric motor 36 carried by the frame 26 and the conveyer belt 23 is provided with adjustable idler rollers 37 and 38 which may be adjusted to maintain the conveyer 23 taut. By virtue of the reversibility of the motor 36, the distributing conveyer 23 may be caused to travel in either direction. When the upper run of the conveyer 23 is traveling in a direction away from the main conveyers 2 and 3, the conveyer 23 is employed as a distributing conveyer, and when its direction of movement is reversed, it is employed as a reclaiming or gathering conveyer. Since its function, regardless of its direction of travel, is the same, I have referred to the conveyer 23 generally as a distributing conveyer and it is to be understood that this expression includes both distribution and gathering.

Means are provided for removing successive articles from the main conveyer and conveying these articles to the receiving end of the distributing conveyer or vice versa for conveying articles from the discharge end of the distributing conveyer (when its direction of travel is reversed) to the main conveyer. The conveyer means associated with the main conveyers, is movable longitudinally of the warehouse with the crane so that it is always in cooperative relation with the main conveyers and with the distributing conveyer regardless of the horizontal or vertical displacement of the distributing conveyer.

Associated with the main conveyers is a structural frame or trailer 41 provided at its lower end with wheels 42 which preferably ride on the longitudinally extending crane rail 15. The trailer is held in upright position in cooperation with the conveyers 2 and 3 by rollers 43 and 44 journaled on shafts secured to the trailer 41 and engaging the skirtboards 8 on the inner side of the runways of the conveyers 2 and 3. In the present construction these skirtboards are formed of channels and the rollers 43 and 44 are provided with flanges which overlie the top rail of the channels to hold the trailer in upright position.

Means are provided for removing articles carried by the main conveyers or for placing articles thereon and these means are mounted on the trailer so that they move longitudinally of the conveyers 2 and 3 in time with the movement of the trailer. The trailer is provided with two extensions or extension frames 45 and 46, to which the shafts of the rollers 43 and 44 are secured and these extension frames lie above the respective runways 5 and 6 and below the respective conveyers 2 and 3. These frames are provided with rollers 47 over which the conveyer belts 2 and 3 travel and the upper surfaces of these rollers are disposed above the planes of the upper surfaces of the skirtboards 8, so that in passing over the frames 45 and 46, the conveyers are elevated so that the elevated portion thereof lies above the upper edge of the respective skirtboard.

Extending upward from each extension frame 45 and 46 at the rear or wall side of the respective conveyers 2 and 3 are plates 51 and 52 to which inclined plows or diverters 53 may be attached for the purpose of deflecting the article from the main conveyer. The position of the deflector or plow will depend upon the direction of movement of the conveyer and is such as to cause an article carried by the main conveyer to be deflected therefrom as it comes into contact with the plow. The plow overlies the elevated portion of the conveyer, so that the intercepted article is readily deflected from the conveyer. When the main conveyer is being employed as a receiving conveyer, that is, when articles are being gathered by the distributing conveyer and conveyed to the main conveyer, the plow is removed. The plow is also removed when it is not desired to remove the articles from the main conveyer, but to permit them to continue to ride thereon. The articles removed from the main conveyer are discharged onto a transverse or transfer conveyer 54, which conveyer is also preferably a belt conveyer, and this conveyer 54 is movable bodily vertically so that it may be brought into cooperative relation with either of the main conveyers 2 or 3, either to receive articles therefrom or to discharge articles thereonto. The transfer conveyer 54 moves around rollers 55—56 which are journaled in the vertically movable frame 57 which is guided in the vertically disposed rails 58 of the trailer. The frame 57 is suspended by the cables 59 which pass over suitable sheaves on to the winding drums 61 mounted on the trailer and driven by the motor 62, also mounted on the trailer. The frame 57 on which the transfer conveyer 54 is mounted, is therefore movable vertically to bring it into cooperative relation with either the upper main conveyer 2 or the lower main conveyer 3. The conveyer 54 is provided with adjustable idler rollers 63, by adjustment of which the conveyer 54 is maintained taut. The frame 57 is provided adjacent the junction of the main conveyer and the transfer conveyer 54 with a fender or guard plate 64 which operates to prevent improper movement of the articles as they are being transferred from the main conveyer to the transfer conveyer.

Means are provided for operatively connecting the distributing conveyer 23 and the transfer conveyer 54, so that these conveyers remain in cooperative association regardless of the vertical displacement of the distributor conveyer 23 or the vertical displacement of the transfer conveyer 54 or the longitudinal movement of the crane and trailer. Pivotally connected to the frame 26 adjacent one end thereof is a ladder or link 65 which is pivotally connected at its other end to the frame 57. This link 65 is in the nature of a truss and forms a connecting link between the frame 26 and the frame 57, permitting vertical movement of the frames 26 and 57 with respect to each other and serving as the structural connection between the frame 26 and the frame 57, to cause the trailer 41 to move longitudinally with the crane.

The link 65 is mounted at one end on the shaft 66, journaled in the frame 26 and secured to the shaft 66 is a roller 67 over which the ladder conveyer 68 travels. At its other end, the link 65 is journaled on the shaft 69 which is journaled in the frame 57 and secured to the shaft 69 is a roller 71 over which the conveyer belt 68 travels. The conveyer belt 68 is provided with adjustable rollers 72 whereby the belt may be maintained taut. Except when the frames 26 and 57 lie in the same horizontal plane, the conveyer 68 is inclined and to prevent slippage of the articles carried thereon, the conveyer 68 is preferably provided with transverse cleats.

The conveyers 23, 68 and 54 are preferably driven from the same source of power, so that they travel synchronously and in the same relative direction. As has been stated before, the conveyer 23 is driven by the motor 36 which is connected to the shaft of the roller 24 by suitable reduction gearing 74. The shaft of the roller 24 is connected to the shaft of the roller 67 by bevel gears 75 so that the conveyer 68 is driven in time with the conveyer 23. The upper roller 71 of the conveyer 68 is driven by the conveyer 68 and the shaft of the roller 71 is connected to the shaft of the roller 55 of the transfer conveyer 54 by the bevel gears 76, so that the conveyer 54 is driven by and in time with the conveyer 68. The motor 36 is reversible and the reversal of the direction of rotation of the motor reverses the direction of travel of the three conveyers 23, 68 and 54.

Due to the size of the roller 67, there is a gap between the end of the conveyer 68 and the conveyer 23, and this gap is filled by a corrugated roller 77, the axis of which is parallel to the axis of the roller 67. The corrugated roller is driven by suitable gearing 78, preferably a chain drive, from the shaft of the roller 67, so that articles are readily moved from one conveyer to the other. Similarly, the gap between the conveyer 54 and the end of the conveyer 68 is filled by a corrugated roller 79 driven from the shaft of the roller 71.

Secured to the frame 57 and overlying the transfer conveyer 54 is a deflector plate 82 which operates, in one direction of travel of the conveyer 54, to deflect the article from the conveyer 54 on to the conveyer 68 and, in the other direction of travel of the conveyer 54, serves as a guide for the article or which, during such direction of movement, may be removed. Similarly, a deflector plate 83 is arranged over the distributing conveyer 23 adjacent the conveyer 68. This plate 83 may be removed when the conveyer 23 is employed as a distributing conveyer but, when the conveyer 23 is employed as a gathering conveyer, the plate 83 serves to deflect the article from the conveyer 23 to the conveyer 68. A guard plate 84 is also arranged at the juncture of the conveyers 54 and 68 and a similar guard plate 85 is arranged at the juncture of the conveyers 68 and 23.

The control of the various motors which drive the various devices forming part of the system, is arranged in the pulpit 22 on the crane, so that the operator may move the various parts of the system to desired relative positions or may reverse the direction of motion of parts of the system in accordance with the function to be performed by the system. By the use of the conveyer system of this invention, a very great saving of labor cost is effected in the stacking and unstacking of articles. The only labor required is that which removes the article from the distributor conveyer and drops it on to the pile or, during the gathering operation, which lifts the article from the pile and places it on to the conveyer 23. This conveyer may be lowered so that it is substantially waist high, thus reducing the labor required to a minimum. The system is of particular advantage in unpiling the articles, since it permits this operation to be accomplished with substantially no damage to the article. This is of importance in the handling of sacks of sugar which are frequently piled in stacks to a height of 50 to 60 sacks and considerable difficulty is experienced in getting the pile broken down without excessive damage to the sacks. Another advantage of the system lies in the ability to exercise all of the functions of the device simultaneously, that is, move the gantry crane longitudinally of the warehouse, raise or lower the suspended conveyer with the stream of articles unabated.

I claim:

1. In a conveyer system, a main conveyer, a distributor conveyer, a horizontally adjustable frame on which said distributor conveyer is mounted, a trailer, means associated with said trailer for removing articles from said main conveyer, and means connected to said trailer and said frame for conveying articles between said trailer and said distributor conveyer.

2. In a conveyer system, a pair of parallel conveyers movable in different directions, another conveyer cooperating with said pair of conveyers, means for moving said other conveyer in the general direction of said pair of conveyers, and means for adjusting the position of said other conveyer with respect to said pair of conveyers to bring it into cooperative relationship with either of said pair of conveyers.

3. In a conveyer system, a main conveyer, a distributing conveyer, a frame on which the distributing conveyer is mounted, means for moving said frame horizontally, means for moving said frame vertically and conveying means pivotally connected to said frame for transporting articles from the main conveyer to the distributing conveyer.

4. In a conveyer system, a main conveyer, a distributing conveyer, a vertically and horizontally adjustable frame on which said distributing conveyer is mounted, means for removing articles from the main conveyer and endless belt conveyer means connected to the distributing conveyer arranged to receive the removed articles and transport them to the distributing conveyer.

5. In a conveyer system, a main conveyer, a distributing conveyer, a vertically and horizontally adjustable frame on which said distributing conveyer is mounted, means for removing articles from the main conveyer, a frame carrying said means and conveying means pivotally connected to said latter frame and the distributor conveyer frame for transporting the articles to the distributing conveyer.

6. In a conveyer system, a main conveyer, a distributor conveyer, a vertically and horizontally adjustable frame on which said distributor conveyer is mounted, a trailer, a conveyer link connecting the frame and the trailer and means carried by the trailer for removing articles from the main conveyer and discharging them onto the conveyer link.

7. In a conveyer system, a main conveyer, a distributing conveyer, a vertically and horizontally adjustable frame on which said distributing conveyer is mounted, a trailer movable along the main conveyer, conveyer means connecting said frame and trailer arranged to permit vertical movement of the frame with respect to the trailer and to cause horizontal movement of the trailer with horizontal movement of the frame and means carried by the trailer for removing articles from the main conveyer and discharging them onto the conveyer means.

8. In a conveyer system, a main conveyer, a second conveyer arranged at right angles thereto, a vertically and horizontally adjustable frame on which said second conveyer is mounted, a trailer associated with the main conveyer, a ladder conveyer connecting said frame and trailer and means for causing the transfer of articles between the main conveyer and the ladder conveyer.

9. In a conveyer system, a main conveyer, a second belt conveyer arranged at right angles thereto, a vertically and horizontally adjustable frame on which said second conveyer is mounted and conveying means for transferring articles from the main conveyer to the second conveyer.

10. In a conveyer system, a main conveyer, a distributing conveyer movable at right angles to the main conveyer, a frame on which said distributing conveyer is mounted, means for moving said frame vertically, means for moving said frame in the direction of movement of the main conveyer, means for removing articles from the main conveyer and conveying means pivotally connected to said frame and removing means for transporting the removed articles to the distributing conveyer.

11. In a conveyer system, a main conveyer, a distributing conveyer, a horizontally and vertically movable frame on which said distributing conveyer is mounted, a second frame associated with the main conveyer, means carried by the second frame for removing articles from the main conveyer, a transfer conveyer mounted on the second frame to receive the removed article and conveying means connecting said frames and arranged between the transfer conveyer and the distributor conveyer.

12. In a conveyer system, a pair of belt conveyers movable in different directions, another belt conveyer cooperating with said pair of conveyers intermediate the ends thereof, and means for adjusting the position of said other conveyer relative to said pair of conveyers to bring it into cooperative relationship with either one of said pair of conveyers.

13. In a conveyer system, a pair of superposed oppositely movable belt conveyers, a conveyer arranged at an angle to the path of movement of said belt conveyers and cooperating with the same, and means for adjusting the position of said conveyer with respect to said belt conveyer to bring it into cooperative relation with either of said belt conveyers.

14. In a conveyer system, a traveling crane, a frame suspended on said crane, means for moving said frame vertically, a conveyer mounted on said frame, a second frame hinged to said first frame and extending laterally therefrom, conveying means on the second frame cooperating with said conveyer in various vertical positions thereof and means for delivering articles to said conveying means.

15. In a conveyer system, a traveling crane, a frame suspended on said crane, means for moving said frame vertically, a conveyer mounted on said frame, a main conveyer and conveying means interposed between and cooperating with said main conveyer and said vertically movable conveyer.

16. In a conveyer system, a traveling crane, a frame suspended on said crane, means for moving said frame vertically, a conveyer mounted on said frame, a main conveyer movable in a path parallel to the movement of the crane, a frame associated with the main conveyer, means on said latter frame for removing articles from the main conveyer, a ladder conveyer frame hingedly connecting the suspended frame with the frame associated with the main conveyer and a ladder conveyer on said ladder conveyer frame cooperating with said suspended conveyer.

17. In a conveyer system, a main conveyer, a traveling crane movable in the direction of the path of travel of the main conveyer, a vertically movable frame suspended on said crane, a distributing conveyer mounted on said frame, a trailer, a link connecting the frame and the trailer, a conveyer mounted on said link and means on the trailer for removing articles from the main conveyer and discharging them on to the link conveyer.

18. In a conveyer system, a main conveyer, a traveling crane movable in the direction of the path of travel of the main conveyer, a vertically movable frame suspended on said crane, a distributing conveyer mounted on said frame, a trailer associated with the main conveyer, a link connecting the trailer and the frame, a conveyer mounted on said link and cooperating with the distributing conveyer, means on the trailer for removing articles from the main conveyer and means on the trailer for delivering the removed articles to the link conveyer.

19. In a conveyer system, a gantry crane, having a leg, vertically disposed guides carried by said leg, a vertically movable frame suspended on said crane, means on one end of the frame engaging said guides and a conveyer mounted on said frame.

20. In a conveyer system, a gantry crane having a leg, vertically disposed guides carried by said leg, a vertically movable frame suspended on said crane, means on the crane for moving said frame vertically, means on one end of the frame engaging said guides, a conveyer mounted on said frame and means on the frame for driving said conveyer.

21. In a conveyer system, a longitudinally movable conveyer, a runway in which said conveyer moves, said conveyer being disposed below the upper edge of the runway, means for elevating a portion of the conveyer above the upper edge of the runway and means for removing articles from the elevated portion of the conveyer.

22. In a conveyer system, a belt conveyer, a runway in which said conveyer moves, said conveyer being disposed below the upper edge of the runway, a frame, rollers on said frame overlying the runway and underlying the belt, causing the belt to be elevated as it passes over the rollers, and means carried by the frame for removing articles from the elevated portion of the belt.

23. In a conveyer system, a belt conveyer, a runway in which said conveyer moves, said conveyer being disposed below the upper edge of the runway, a frame, rollers carried by the frame and interposed between the belt and the runway to elevate the belt as it passes over the rollers, means carried by the frame for removing articles from the elevated portion of the belt and a second conveyer arranged to receive the removed articles.

24. In a conveyer system, a pair of superposed oppositely movable belt conveyers, a conveyer arranged at an angle to the path of movement of the belt conveyers and cooperating with said belt conveyers and means for moving said latter conveyer vertically to bring it into cooperative relation with either of the belt conveyers.

25. In a conveyer system, a main conveyer, a traveling crane movable in the direction of the path of movement of the main conveyer, a vertically adjustable frame carried by the crane, a conveyer mounted on said frame, a trailer associated with the main conveyer, a link connecting said frame and trailer, a ladder conveyer mounted on said link and means on said frame for driving the conveyer thereon and the ladder conveyer.

26. In a conveyer system, a main conveyer, a traveling crane movable in the direction of the path of movement of the main conveyer, a vertically movable frame carried by said crane, a distributing conveyer mounted on said frame, a trailer associated with the main conveyer, a link connecting the trailer and the frame, a ladder conveyer on said link cooperating with the distributing conveyer, means on the trailer for removing articles from the main conveyer, a transfer conveyer on the trailer cooperating with the ladder conveyer and means on the frame for driving the distributing, ladder and transfer conveyers.

27. In a conveyer system, a pair of superposed oppositely movable main conveyers, a traveling crane movable in the direction of the path of movement of the main conveyers, a vertically movable frame carried by the crane, a third conveyer mounted on said frame, a trailer associated with the main conveyers, a frame carried by the trailer, a fourth conveyer mounted on said latter frame, means for moving said latter frame vertically to bring the fourth conveyer into cooperative relation with either of the main conveyers, a link connecting said frames and a fifth conveyer mounted on said link and cooperating with said third and fourth conveyers.

In testimony whereof, I have hereunto set my hand.

CLARENCE WHITE.